United States Patent
Wurth et al.

(10) Patent No.: US 9,791,007 B2
(45) Date of Patent: Oct. 17, 2017

(54) ASSEMBLED AXLE BRAKE DISC (71) Applicant: Faiveley Transport Witten GmbH, Witten (DE)

(72) Inventors: Sebastian Wurth, Wipperfurth (DE); Andreas Mehlan, Unna (DE)

(73) Assignee: Faiveley Transport Witten GmbH, Witten (DE)

( * ) Notice: Subject to any disclaimer, the term of this patent is extended or adjusted under 35 U.S.C. 154(b) by 60 days.

(21) Appl. No.: 14/364,771

(22) PCT Filed: Nov. 13, 2012

(86) PCT No.: PCT/EP2012/072472
§ 371 (c)(1),
(2) Date: Jun. 12, 2014

(87) PCT Pub. No.: WO2013/087322
PCT Pub. Date: Jun. 20, 2013

(65) Prior Publication Data
US 2014/0374201 A1     Dec. 25, 2014

(30) Foreign Application Priority Data

Dec. 12, 2011 (DE) ................. 20 2011 052 265

(51) Int. Cl.
*F16D 65/12* (2006.01)
*B23K 1/00* (2006.01)
*F16D 65/02* (2006.01)

(52) U.S. Cl.
CPC .......... *F16D 65/128* (2013.01); *B23K 1/0008* (2013.01); *F16D 65/12* (2013.01);
(Continued)

(58) Field of Classification Search
CPC ................... F16D 65/12; F16D 65/128; F16D 2250/0084; F16D 65/122; F16D 65/123;
(Continued)

(56) References Cited

U.S. PATENT DOCUMENTS 1,879,744 A     9/1932   Heiney
2,375,566 A *   5/1945   Lipps ................... F16D 65/123
                                                  188/218 XL
(Continued)

FOREIGN PATENT DOCUMENTS

DE     1132950        7/1962
EP     2028387 A1     2/2009
(Continued)

OTHER PUBLICATIONS

Office Action for Japanese Application No. 2014-546384 dated Mar. 31, 2016.
(Continued)

*Primary Examiner* — Robert A Siconolfli
*Assistant Examiner* — Sam Aung
(74) *Attorney, Agent, or Firm* — Kelly & Kelley, LLP (57) ABSTRACT

The invention relates to an assembled undular brake disc having a hub and having two friction rings which are arranged parallel to and spaced apart from one another, which assembled undular brake disc can withstand high mechanical loads and permits good internal ventilation, wherein an insert element with arms extending radially outward in a stellate manner is arranged between the friction rings.

23 Claims, 5 Drawing Sheets

(52) U.S. Cl.
CPC ......... *F16D 65/122* (2013.01); *F16D 65/123* (2013.01); *F16D 2065/136* (2013.01); *F16D 2065/1316* (2013.01); *F16D 2250/0084* (2013.01); *Y10T 29/49826* (2015.01)

(58) Field of Classification Search
CPC .... F16D 65/125; F16D 65/126; F16D 69/023; F16D 2200/0039; F16D 2200/0047; F16D 2065/132; F16D 2065/1316; F16D 2065/1328; F16D 2065/1332; F16D 2065/1384; F16D 2065/1392; B32K 1/0008
USPC ........ 188/218 XL, 71.6, 73.2, 218 R, 250 B, 188/251 A, 264 A, 264 AA; 29/428; 228/182; 192/107 R
See application file for complete search history.

(56) References Cited

U.S. PATENT DOCUMENTS

| | | | | |
|---|---|---|---|---|
| 2,410,195 | A | * | 10/1946 | Baselt .................. F16D 65/123 164/333 |
| 3,295,641 | A | | 1/1967 | Eaton et al. |
| 3,610,873 | A | * | 10/1971 | Vansteenkiste .... B23K 15/0046 219/121.14 |
| 3,933,228 | A | | 1/1976 | Otto et al. |
| 6,032,769 | A | * | 3/2000 | Daudi ................ F16D 65/0006 188/218 R |
| 6,119,827 | A | * | 9/2000 | Militello ................ F16D 65/12 188/218 XL |
| 2006/0175160 | A1 | * | 8/2006 | Weiss ..................... F16D 65/12 188/218 XL |
| 2007/0181390 | A1 | * | 8/2007 | Korm .................... F16D 65/128 188/218 XL |
| 2008/0135359 | A1 | * | 6/2008 | Basirico ................ F16D 65/122 188/218 XL |
| 2008/0142319 | A1 | * | 6/2008 | Manter ................ B23K 1/0018 188/218 XL |
| 2009/0035598 | A1 | * | 2/2009 | Hanna .................... B22D 19/00 428/550 |
| 2009/0090436 | A1 | * | 4/2009 | Chenoweth .............. C21D 6/04 148/557 |
| 2009/0272610 | A1 | * | 11/2009 | Moessinger .......... F16D 65/125 188/264 AA |

FOREIGN PATENT DOCUMENTS

| | | |
|---|---|---|
| FR | 2745349 A1 | 8/1997 |
| JP | S58-174734 A | 10/1983 |
| JP | H06-035690 U | 5/1994 |
| JP | 2001-280381 A | 10/2001 |
| JP | 2008-291997 A | 12/2008 |
| JP | 2009-501880 A | 1/2009 |

OTHER PUBLICATIONS

Patent Examination Report No. 1 for the Australian Patent Application No. 2012351030 dated Feb. 26, 2016.
International Search Report for International Application No. PCT/EP2012/072472 dated Feb. 13, 2013.

* cited by examiner

ASSEMBLED AXLE BRAKE DISC

FIELD OF INVENTION

The present invention relates to an assembled axle brake disc with a hub and two friction rings which are arranged parallel to and spaced apart from one another.

BACKGROUND OF THE INVENTION

Assembled axle brake discs are used in particular for rail vehicles, and due to the built form of the axle brake discs, these can be assembled from several individual components.

An assembled axle brake disc is understood as being primarily an axle brake disc that is assembled from at least two components. In particular, an assembled axle brake disc is intended to describe a brake disc that comprises two friction rings that are not formed as a single piece and that share a uniform structure, for example as is known in a casting method, but which are provided individually and which are preferably assembled using further elements to form a friction ring pair using joining techniques. As a further individual part, the hub can be joined in an assembly with the friction ring pair.

For example, axle brake discs are known that comprise a hub, to which the two friction rings are attached parallel to and spaced apart from one another. Between the friction rings, connecting elements can be located that are designed to absorb axially acting pad contact pressure forces. In particular in the case of heavy rail vehicles, the pad contact pressure forces that are applied onto the friction ring pair by the brake linkage via the brake pads can reach very high values. For this reason, the need arises to embody axle brake discs with connecting elements that are arranged between the friction rings in a suitably stiff and mechanically highly resilient manner.

Furthermore, good heat removal is required, and it is frequently provided that an airflow is generated between the friction rings that for example axially flows onto the axle brake disc on the hub side and flows out radially on the outside. As a result of this air throughput, the brake disc can be cooled by heat convection between the friction rings, and the airflow is generated through the rotation of the axle brake disc around its axis of rotation. In particular in the case of cast axle brake discs, casting geometries between the friction rings are known that simulate the geometry of a radial fan, so that the corresponding air throughput results through the axle brake disc.

In particular, assembled axle brake discs as ceramic brake discs are known, which comprise friction rings made of a ceramic material, generally however of a material from the group of carbons. Frequently, the hub of such non-metallic brake discs is made of a steel material, and elaborate connecting geometries are required in order to avoid heat-induced distortions between the ceramic or carbon material and the metallic hub for receiving the friction rings.

PRIOR ART

From DE 195 07 922 C2, an assembled axle brake disc is known that comprises two friction rings arranged in parallel to and spaced apart from one another on a hub. Between the friction rings, a fan insert is located that serves for improving the cooling on the inside of the friction rings. In order to receive axially acting pad contact pressure forces for the braking operation, the shown fan insert is however unsuitable, and axial forces that act through the brake calliper via the brake pads onto the friction rings must be received via the connection between the friction rings and the hub. For this reason, a design of an axle brake disc that comprises a somewhat lower mechanical load capacity is obtained.

From DE 195 43 799 A1 a further assembled axle brake disc is known, and between friction rings made of a material from the group of carbons, connecting elements extend in order to absorb the high axially acting pad contact pressure forces. Such a construction is known for assembled axle brake discs with friction rings that are made of ceramic or a material from the group of carbons. The built form of the axle brake disc is in particular used because positively joined connections between the friction rings of a material from the group of carbons to a hub that is as a rule produced from steel cannot be used in a simple manner. As a result, screw connections or other force- or form-fit connecting techniques are used, wherein in the assembly joint between the friction rings and the hub, elements are frequently also arranged that offset the different thermal expansion between the hub made of a steel material and the friction rings made of ceramic or a material from the group of carbons, for example formed by slot nuts.

In particular when a rigid, highly resilient, solid connection is used between the friction rings, the disadvantage arises of a high degree of spatial filling between the friction rings, as a result of which the ventilation of the axle brake disc is in turn hindered.

SUMMARY OF THE INVENTION

It is therefore the object of the present invention to provide an assembled axle a brake disc with friction rings that can withstand high mechanical loads, and which enables good internal ventilation.

This object is attained by means of an assembled axle brake disc, comprising: a hub; and two friction rings which are arranged parallel and spaced apart from one another; wherein between the friction rings an insert element is arranged with arms extending radially outward in a stellate manner.

The invention includes the technical principle that between the friction rings, an insert element is arranged with arms extending radially outward in a stellate manner.

Due to the arrangement according to the invention of an insert element that comprises arms extending radially outward in a stellate manner, an axle brake disc with high mechanical resilience is provided, since the insert element can be built from a solid, preferably steel material body. If when the axle brake disc is operated pad contact pressure forces act on the friction rings, these forces can be absorbed by the solid structure of the friction rings in the packet with the insert element without significant elastic distortions. On the other hand, the insert element is designed to provide good internal ventilation despite the high axial rigidity of the axle brake disc, since the arms of the insert element that simultaneously rotate create good ventilation of the axle brake disc.

Furthermore, supporting bolts can be provided that are arranged additionally to the insert element between the friction rings. Here, the supporting bolts do not require a connection to the insert element, in particular to the arms of the insert element. For example, the supporting bolts can be arranged between the arms of the insert element, preferably in order to generate a tangential airflow between the friction rings in addition to a radial airflow generated by the arms. Here, the supporting bolts can for example comprise a cylindrical form, and adopt a cooling function alongside the supporting function for further absorption of pad contact pressure forces on the friction rings.

The friction rings can also preferably be made of a steel material, wherein however for the friction rings, a material from the group of carbons can also be used. In a particularly advantageous manner, the friction rings can be made of a heat-resistant steel material, while for the insert element, low-cost, heat-treatable steel can be selected. In order to procure simple, minimal cost and rapid production of the assembled axle brake disc, according to a further advantage of the invention, it is provided that the friction rings are soldered to the insert element. The solder can be arranged in the form of a paste or foil into the joints between the insert element and the friction rings. The soldering method can be brazing and in a particularly preferred manner, high-temperature soldering, wherein in particular the high-temperature soldering can be conducted in a vacuum or in a protective gas atmosphere. If the high-temperature soldering is conducted in a protective gas atmosphere, nitrogen can in particular be used as a protective gas. In particular, the connection between the supporting bolts and the inner sides of the friction rings can also comprise a solder connection, and the bolts can be bluntly placed on the inner surface of the friction rings without the supporting bolts having to be retained in holes in the friction rings.

As an alternative to the connecting technique of soldering, the connections between the insert element or the supporting bolts and the friction rings can also comprise screw connections, rivet connections or weld connections, for example.

With the combination of the insert element and the friction rings, a friction ring pair is created that can be handled individually without the hub. In particular, due to the friction ring pair that is provided as an individual replacement part, the advantage is created that with a hub, which for example can be mounted in a rail vehicle on an axle, an old friction ring pair can be replaced by a new friction ring pair.

As a further advantage, it can be provided for the connection between the friction ring pair and the hub that the connection is created between the insert element and the hub. The connection between the insert element and the hub can for example be created by several screw connections, wherein the insert element comprises an opening on the inner side, in which the hub is arranged and connected to the insert element.

In order to form the screw connections, the insert element can comprise several holes, and on the hub, several protrusions can be provided that are directed radially outwards, which are also designed with holes. In order to produce the screw connections, screw elements can be used that are fed through both the holes in the insert element and the holes in the protrusions in the hub. For example, on the circumference between the hub and the opening in the insert element, nine screw connections can be arranged at an equal distance from each other.

According to a further advantage, one, preferably several and in a particularly preferred manner, three screw connections can be provided with a sliding block in order to position the insert element with the friction rings on the hub. The sliding blocks can sit with one body part in a pocket milled into the protrusion of the hub, and with a further body part the sliding block can be inserted into a centring hole that is arranged on the insert element. Alternatively, the option advantageously also exists of inserting the slot nuts into pockets that are arranged on the inner side on the insert element.

Furthermore, it is advantageous when the screw connections comprise screw nuts, which are screwed to the screw elements when these are fed through the holes in the insert element and in the protrusions of the hub. It is also advantageous when a retaining ring is used, against which the screw nuts are tensioned. The retaining ring can comprise a ring form, and a number of holes are created in the ring, through which the screw elements are fed through. Finally, the screw nuts can be screwed onto the ends of the screw elements and tensioned against the retaining ring, in particular using tension plates.

The insert element can comprise a flat extension, and the insert element can for example be of approximately double the thickness of a friction element. In the centre of the insert element, an opening can be created, which is designed as a circle, and which extends centrally around the axis of rotation of the axle brake disc. Essentially, the insert element can be formed from a basic section, and from the basic section, the arms extend radially in an outward direction. As a result, the insert element forms a star, and the arms form the essential supporting bodies between the friction rings, in order to absorb the pad contact pressure forces that act in the axial direction on the axle brake disc. The friction rings also comprise an opening on the hub side, into which the hub is inserted. The basic section of the insert element can here comprise a maximum diameter that is smaller than the central opening in the friction rings. Thus, only the arms of the insert element extend between the friction rings.

For example, the insert element can comprise 6 to 30, preferably 12 to 24, and in a particularly preferred manner, 18 arms, wherein arms with a broad form and arms with a narrow form can be provided, which in particular are arranged alternately in their broad and narrow form on the basic section of the insert element. Thus, an arm with a broad form is adjoined on both sides by arms with a narrow form, and arms with the narrow form are adjoined on both sides by arms with the broad form. Thus, nine arms with the narrow form and nine arms with the broad form can be arranged on the basic section of the insert element.

In particular in order to improve the aeration for the interior ventilation of the axle brake disc, it is advantageous that a portion of the plurality of arms, in particular a portion of the arms with the narrow form, is separated from the basic section. Thus, only the arms with the broad form create a connection between the friction ring pair and the insert element and the hub. The separation of the arms from the basic section is achieved by removing material from the basic section, so that for example the bridges that extend between the arms and the central opening in the basic section of the insert element are removed. The removal of the bridges can be achieved for example by means of milling, but also through laser beam cutting or water jet cutting. As a result, the arms with the narrow form can extend from the outer side of the friction rings to the inner side of the friction rings, and the arms with the broad form can extend from the outer side of the friction rings to the join on the protrusions on the hub.

The insert element can be formed from two partial elements that adjoin each other with flat surfaces, and are in particular soldered together, so that the partial elements can comprise a base material that only comprises half the thickness of the insert element, and the partial elements can also be connected to each other by means of a brazing method or high-temperature soldering.

The object of the present invention is further attained by means of a method for producing an axle brake disc with a hub and two friction rings, which are arranged parallel to and spaced apart from one another. Here, the method envisages at least the steps of providing an insert element with a flat design, with arms extending radially outwards in a stellate manner and the joining of the friction rings to the flat sides of the insert element, so that the insert element is arranged between the friction rings, and further, the step of joining the insert element to the hub is envisaged.

The joining of the friction rings to the insert element can be conducted using a soldering procedure, preferably using brazing and in a particularly preferred manner using high-temperature soldering in a vacuum or in a protective gas atmosphere. In particular, the insert element and/or the friction rings can be heat treated, wherein the heat treatment can in particular be conducted in combination with the method step of brazing or high-temperature soldering in a vacuum or in a protective gas atmosphere.

First, the friction rings and/or the insert element can be cut from metal sheets using a thermal or abrasive cutting method, in particular using laser beam cutting or water jet cutting. Here, the insert element can be provided by two partial elements that share a uniform structure and that are arranged parallel to each other on the plane. Here, the partial elements can also be connected to each other by means of a soldering procedure. Alternatively, production is possible by sawing round material Ø640 to the corresponding thickness.

When producing the friction rings and the insert element, holes can be provided in the friction rings and in the insert element by means of laser beam cutting or water jet cutting, and when the friction rings and the insert element have been brought in contact with each other in their packet arrangement, clamping pins can be fed through the holes. As a result, a centring of the friction rings on the insert element is achieved, and after the solder has been arranged in the joints between the partial elements of the insert element and between the friction rings and the insert element, the packet consisting of the insert element and the friction rings can be placed in a vacuum furnace. This can heat the friction rings and the insert element to a soldering temperature of e.g. 1050° C. to 1070° C., and the temperature is maintained until the solder melts and a connection is formed in the respective joints. Then, the packet consisting of the insert element and the friction rings, through which now, a friction ring pair has been formed that can be handled individually, is quenched in the vacuum furnace, for example by using nitrogen, and annealed. As a result, the soldering process is accompanied by the desired process of heat treatment. Here, the entire process can take place in the vacuum furnace. Alternatively, only the soldering process can take place in the vacuum furnace, wherein subsequently, however, the friction ring pair is transferred in a separate furnace for the heat treatment, and oil can be used, for example, as the quenching medium in order to achieve a higher quenching speed, wherein the use of water, a polymer or other media is also possible. As a result, in the friction rings, but also in the insert element, a certain framework structure can be achieved, which gives the axle brake disc particularly advantageous material properties. After the soldering, or after the heat treatment, the friction ring pair can be brought to a defined thickness by machining the outer surfaces of the friction rings. The clamping pins can be of a length that is less than the thickness of the friction ring pair. Alternatively, protruding sections of the clamping pins can be milled off by machining the friction ring pair, or the clamping pins are again removed from the friction ring pair following the soldering process.

The insert element can comprise a basic section onto which the arms are arranged that extend outwards in a radial direction, and as a further, in particular final method step for processing the friction ring pair, it can be provided that a portion of the number of arms is separated from the basic section, in particular by machine-cutting processing of the basic section. In particular, the arms with the narrow form can be detached from the basic section by cutting out the root area of the narrow arms at the transfer point to the basic section through milling, so that the arms with the narrow form only extend radially from the outer side of the friction rings to the inner side of the friction rings. By contrast, the arms with the broad form extend radially inwards from the outer side of the friction rings to the overlap with the protrusions in the hub, in order to create the screw connections between the hub and the arms. As a result of this measure, the interior ventilation in particular of the axle brake disc is improved, since the basic section of the insert element is not hindered by an air throughput.

BRIEF DESCRIPTION OF THE DRAWINGS

Further measures that improve the invention will be presented in greater detail below together with the description of preferred exemplary embodiments of the invention with reference to the figures, in which.

The same reference numerals from different exemplary embodiments refer to the same functional parts, with slightly different features.

DETAILED DESCRIPTION OF THE PREFERRED EMBODIMENTS

Figure 1:
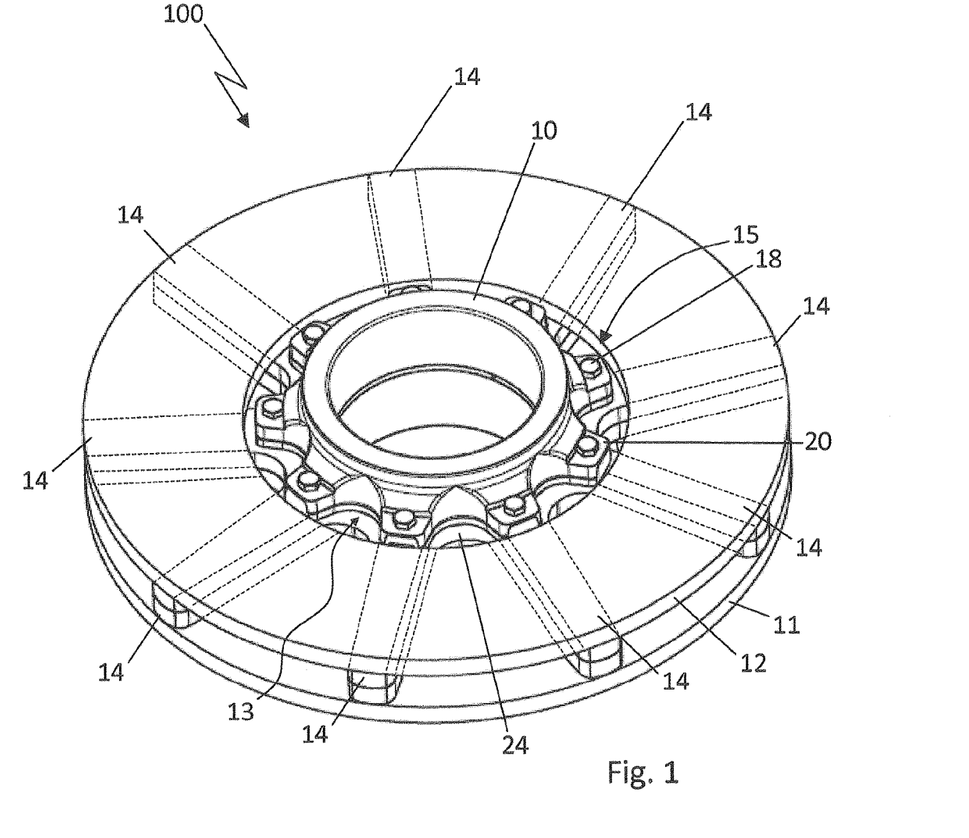
FIG. 1 shows an exemplary embodiment of an axle brake disc in a perspective view with the features of the present invention

FIG. 1 shows in a perspective view an exemplary embodiment of an axle brake disc 100 according to the invention, and the axle brake disc 100 is compiled from several individual parts, so that the axle brake disc 100 is designed as an assembled axle brake disc 100.

The axle brake disc 100 comprises a hub 10, and in the hub 10 a central passage is created, through which a shaft can extend on which the axle brake disc 100 is arranged. Further, the axle brake disc 100 comprises friction rings 11 and 12, which are arranged parallel to and spaced apart from one another, and which form the friction surfaces for contact with brake pads.

According to the invention, an insert element 13 is inserted between the friction rings 11 and 12, which comprises arms 14 that extend radially outwards in a stellate manner. The arms 14 are arranged at equal distances over the circumference of the axle brake disc 100, wherein the exemplary embodiment comprises nine arms 14. The arms 14 are designed with a length such that they end flush with the outer circumference of the friction rings 11 and 12.

On the hub 10, protrusions 20 are arranged that extend over a basic section 24 of the insert element 13 and are brought into overlap with this. Between the basic section 24 of the insert element 13 and the protrusions 20 of the hub 10, screw connections 15 are provided that are essentially formed by screw elements 18. Thus, the friction rings 11 and 12 are connected to the hub 10 via the insert element 13 and the friction rings 11 and 12 together with the insert element 13 form a friction ring pair, which can be arranged as an assembly that can be individually handled on the hub 10. If for example a replacement of a worn friction ring pair on the axle brake disc 100 is required within the scope of maintenance work, it is only necessary to detach the friction ring pair from the hub 10 and replace it with a new friction ring pair.

Due to the stellate structure of the insert element 13 with the basic section 24 and the arms 14 that extend radially outwards from the basic section 24, an airflow is created through the axle brake disc 100, which flows through the axle brake disc 100 from the inside outwards, and the flow occurs between the arms 14.

In a manner not shown in greater detail, cooling elements can be provided between the friction rings 11 and 12, which are for example arranged on at least one of the inner sides of the friction rings 11 and 12. The cooling elements can for example be arranged using stud welding, or also using a screw fitting or a solder, on the inner side of the friction rings 11 and 12. As a result, the ventilation of the axle brake disc 100 can be further improved.

Figure 2:
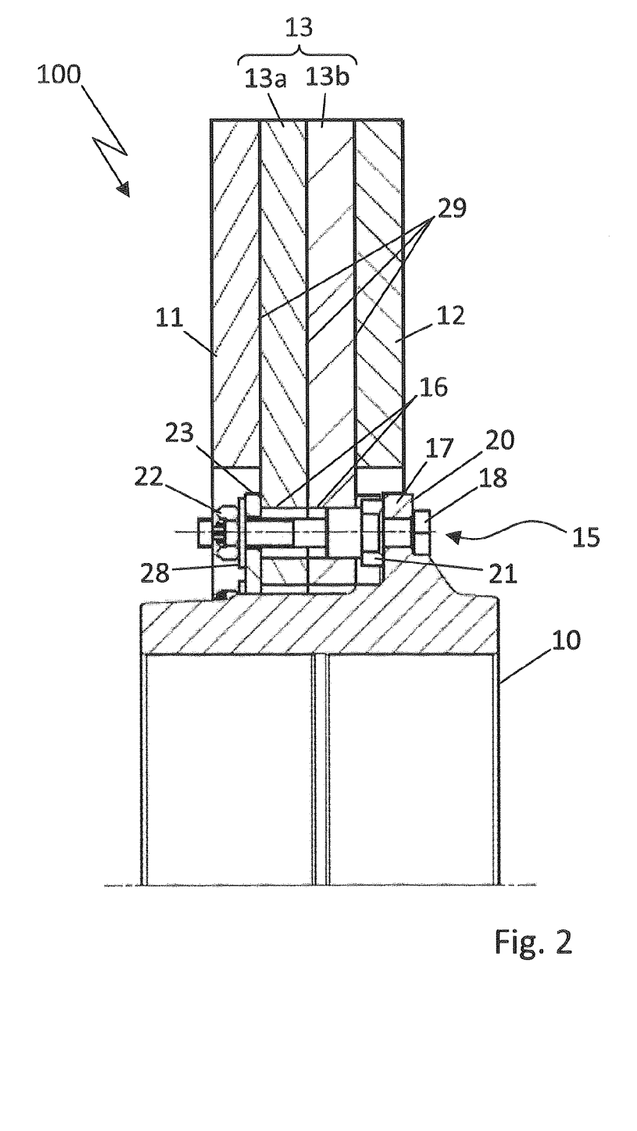
FIG. 2 shows a cross-section through an axle brake disc with an insert element and friction rings arranged on this

FIG. 2 shows a cross-sectional view through the axle brake disc 100, of which only half the side is shown. Here, the hub 10 is shown with a protrusion 20 in cross-section, and on the protrusion 20, the insert element 13 is arranged using a screw connection 15. The screw connection 15 shows the screw element 18, which extends through a hole 16 in the insert element 13 and through a hole 17 in the protrusion 20. Adjacent to the protrusion 20, a sliding block 21 is arranged, which sits in a form-fit manner in a pocket milled into the protrusion 20. A further section of the sliding block 21 extends in a form-fit manner into the hole 16 in the insert element 13, so that the insert element 13 is centred via the sliding block 21 to the hub 10.

Further, the screw connection 15 comprises a screw nut 22, which is screwed onto the free end of the screw shaft of the screw element 18. Below the screw nut 22, a washer 28 is arranged, together with a retaining ring 23 that surrounds the hub 10, and in the retaining ring 23, a number of holes are provided in order to guide the corresponding number of screw elements 18 through the retaining ring 23.

On the outer side of the insert element 13, friction rings 11 and 12 are arranged, and the insert element 13 is formed from a first partial element 13a and a section partial element 13b, and the partial elements 13a and 13b are brought into contact with each other on a flat parallel. The joints 29 between the friction rings 11 and 12 and between the partial elements 13a and 13b of the insert element 13 are designed as solder joints, and the friction rings 11 and 12 are soldered with the insert element 13, in particular also together with the partial elements 13a and 13b in a vacuum furnace using a high-temperature soldering process. The insert element 13 can also be designed as a single part, so that the joints 29 are limited to the connections between the friction rings 11 and 12 and the insert element 13.

Figure 3:
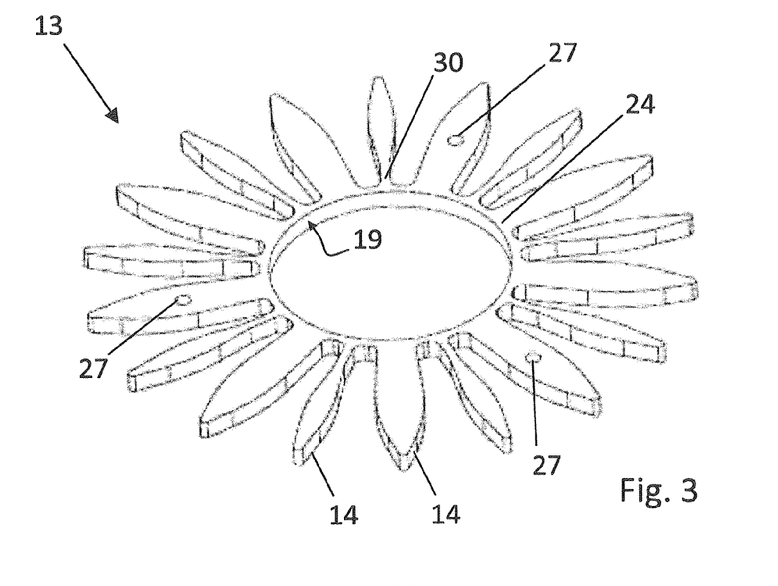
FIG. 3 shows a perspective view of a further exemplary embodiment of an insert element

FIG. 3 shows a perspective view of an insert element 13 with a basic section 24, from which 18 arms 14 in total extend radially outwards. In the basic section 24, an opening 19 is created, in which the hub 10 can be arranged.

The arms 14 are formed by arms 14 with a broad form and arms 14 with a narrow form, which are arranged alternately in their broad and narrow form adjacent to the basic section 24 of the insert element 13. The exemplary embodiment of the insert element 13 shows the arms 14 with forms that are curved in the lateral direction, so that the arms 14 comprise a bulged contour, and the arms 14 with the narrow form taper severely in their arm root 30 in the transfer point to the basic section 24. By contrast, the arms 14 with the broad form comprise a correspondingly large transfer point cross-section to the basic section 24, without tapering.

Further, in for example three arms 14, holes 27 are created, via which the friction rings 11 and 12 can be positioned on the insert element 13, as is shown in greater detail in the following FIG. 4.

Figure 4:
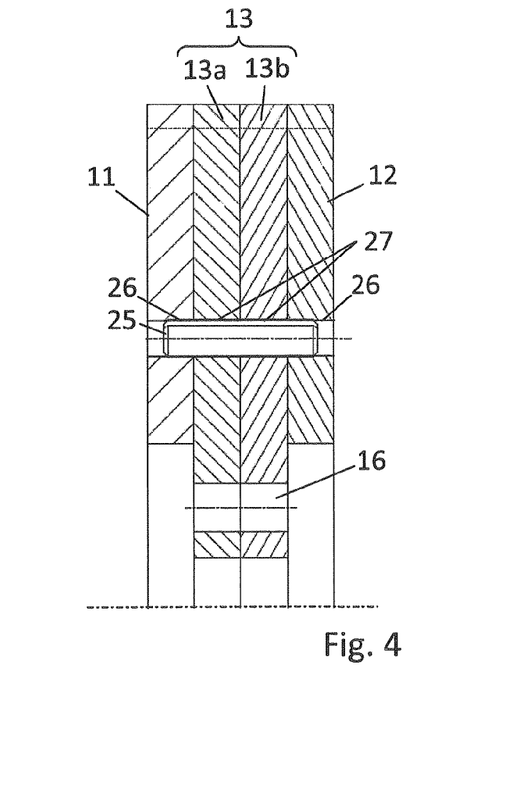
FIG. 4 shows a cross-section view through the insert element and the friction rings, wherein a clamping pin is shown for positioning the friction rings on the insert element

FIG. 4 shows a cross-section through the friction ring pair with the friction rings 11 and 12 and the insert element 13, which is for example formed from the two partial elements 13a and 13b. In the insert element 13, the hole 16 for guiding through the screw element 18 is shown, in order to connect the friction ring pair via the insert element 13 to the hub 10, as has already been described in FIG. 2.

In order to centre the friction rings 11 and 12 on the insert element 13, a hole 26 is created in each of the friction rings 11 and 12, and the holes 26 are flush with the hole 27 in the insert element 13. A clamping pin 25 is inserted into the holes 26 and 27, via which the friction rings 11 and 12 are positioned on the insert element 13. Overall, holes 27 can be created in three arms 14, and corresponding to the holes 27 in the arms 14, in each friction ring 11 and 12, three holes 26 are also created. Here, the holes 26 and 27 can already be produced during production of the friction rings 11 and 12, as well as during production of the insert element 13, using the thermal and/or abrasive separation process. The dimensional accuracy of the holes 26 and 27 can for example already be sufficient using laser beam cutting or water jet cutting in order to ensure the required centring of the friction rings 11 and 12 on the insert element 13.

Figure 5:
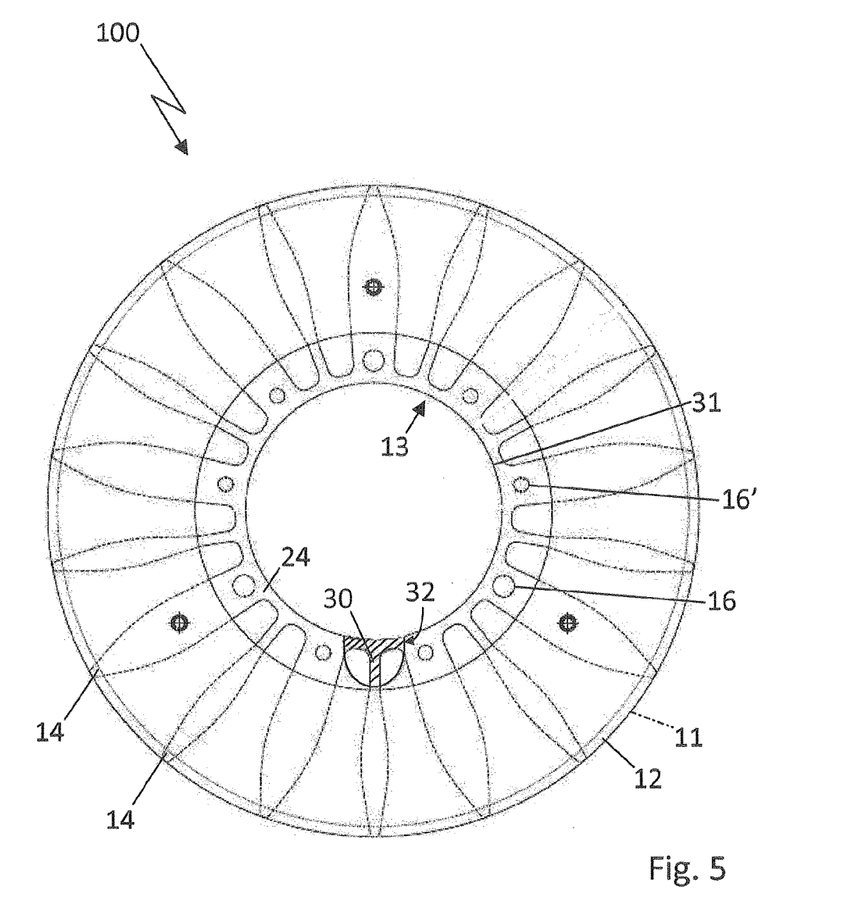
FIG. 5 shows a top view onto the axle brake disc with the friction rings and the insert element before milling of the insert element.

In FIG. 5, the axle brake disc 100 is shown in a top view, and on the insert element 13, the friction rings 11 and 12 are shown in an arranged manner. The friction rings 11 and 12 are already soldered to the insert element 13, and the basic section 24 of the insert element 13 protrudes on the inner side from the respective central opening 31 of the friction rings 11 and 12. The insert element 13 comprises arms 14 with a broad and a narrow form, and with one arm 14 with the narrow form, a material cut-off 32 in the basic section 24 of the insert element 13 is shown, which comprises the arm root 30 of the arm 14.

The method for producing the axle brake disc 100 comprises, according to the exemplary embodiment shown, a method step in which the material cut-off 32 is removed from the basic section 24 of the insert element 13 on each arm 14 with the narrow form using a machining process. For example, the material cut-off 32 can be milled out of the basic section 24, so that the arm 14 with the narrow form remains between the friction rings 11 and 12. The connection to the hub 10 is thus achieved via the ends of the arms 14 with the broad form that are directed radially inwards, in which the holes 16 have been created. Here, holes 16' are formed as passage holes, and the holes 16 that have a larger diameter serve to retain a section of the sliding block 21, as shown in FIG. 2.

Figure 6:
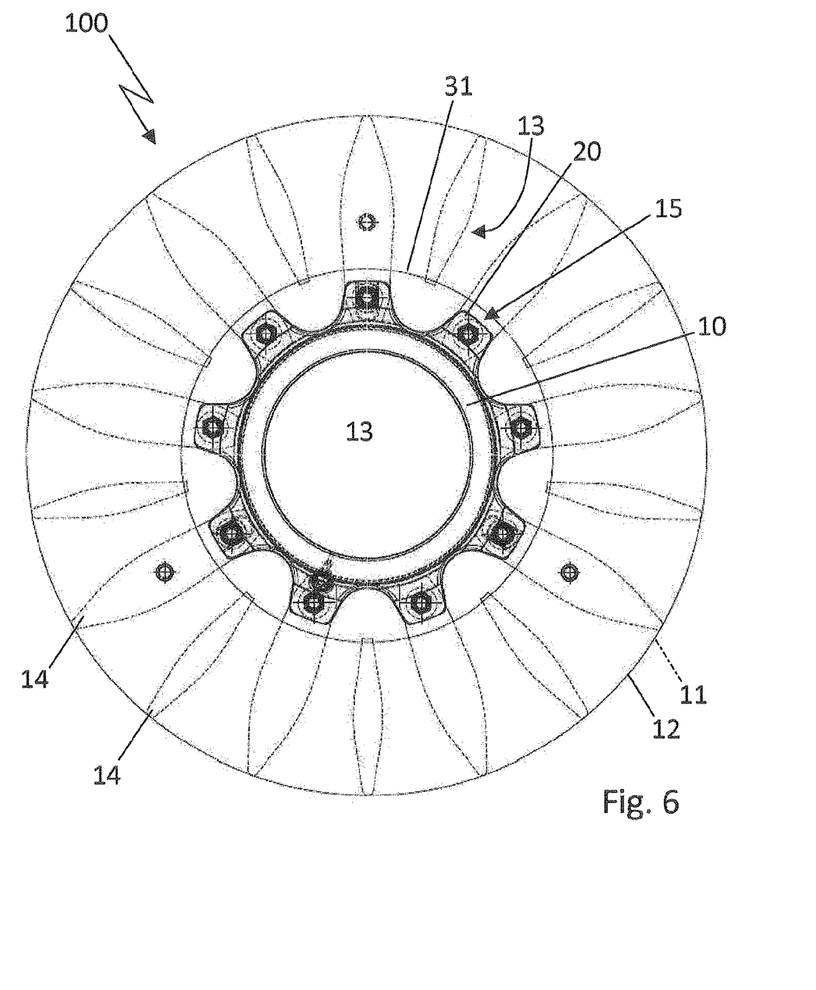
FIG. 6 shows a top view onto the axle brake disc after milling has been conducted on the insert element, and wherein the hub is connected to the insert element.

FIG. 6 finally shows the axle brake disc 100 in its finished form. Between the friction rings 11 and 12, the insert element 13 is located, which is now formed from the arms 14 that extend radially between the friction rings 11 and 12.

The arms 14 with the narrow form extend from the central opening 31 of the friction rings 11 and 12 through to the outer edge, and the arms 14 with the broad form extend from the outer side of the friction rings 11 and 12 into the opening 31 in order to create an overlap with the protrusions 20 of the hub 10. Finally, the arms 14 with the broad form with the protrusions 20 can be affixed via the screw connections 15 to the hub 10. This provides the arrangement of the friction ring pair with the friction rings 11 and 12 via the arms 14 with the broad form with the hub 10. The insert element 13 is shown with the material cut-offs 32 that have already been removed using a machining process, see FIG. 5. Following the removal of the material cut-offs 32, the arms 14 are detached from each other, so that the basic section 24 of the insert element 13 is now limited to the ends of the arms 14 that are directed radially inwards.

Due to the insert element 13, which is restricted solely to the arms 14, the aeration of the axle brake disc 100 is further optimised, since a free airflow can be created from the inner side to the outer side between the friction rings 11 and 12. At the same time, a high degree of rigidity in the axle brake disc 100 with a relatively low weight is achieved, since the arms 14 form a sufficiently rigid insert between the friction rings 11 and 12.

The invention is not restricted in its implementation to the preferred exemplary embodiment described above. To a far greater extent, a number of variants are possible, which also use the solution presented with embodiments of a fundamentally different type. All the features and/or advantages arising from the claims, the description or the drawings, including structural details or spatial arrangements, can be essential to the invention both in their own right and in a wide range of different combinations.

The invention claimed is:

1. An assembled axle brake disc for rail vehicles, comprising:
   a hub;
   two friction rings which are arranged parallel and spaced apart from one another;
   and
   an insert element formed from two partial elements which adjoin each other in a flat manner and which are soldered to each other, wherein the insert element comprises a basic section and arms, wherein the arms are arranged on the basic section and extend radially outwards in a stellate manner, wherein arms with a broad form and arms with a narrow form are provided and arranged alternately in their broad and narrow form on the basic section of the insert element, wherein a portion of the arms in their narrow form is separated from the basic section, wherein the insert element is configured flat, wherein the basic section comprises a central opening in which the hub is disposed,
   wherein the insert element is arranged between the friction rings in such a way that the friction rings rest against the flat sides of the insert element, wherein the insert element comprises at least one connection with the hub, wherein the basic section of the insert element comprises holes and wherein the hub comprises several protrusions with holes, wherein the protrusions are distributed about an outer circumference of the hub and extend radially outward.

2. An axle brake disc according to claim 1, wherein the friction rings are soldered with the insert element by means of brazing.

3. An axle brake disc according to claim 2, wherein the friction rings are soldered with the insert element by means of high-temperature soldering in a vacuum or in a protective gas atmosphere.

4. An axle brake disc according to claim 1, wherein at least one of the screw connections comprises a sliding block in order to position the insert element with the friction rings on the hub.

5. An axle brake disc according to claim 4, wherein the screw connections comprise screw nuts, wherein a retaining ring is provided against which the screw nuts are tensioned using washers.

6. An axle brake disc according to claim 4, wherein several screw connections are provided, wherein three screw connections of the several screw connections comprise a sliding block in order to position the insert element with the friction rings on the hub.

7. An axle brake disc according to claim 1, wherein the arms comprise a curved form lateral to their radial direction of extension.

8. An axle brake disc according to any one of claims 1, 2 or 3, wherein the insert element comprises 3 to 30 arms.

9. An axle brake disc according to claim 8, wherein the insert element comprises 12 to 24 arms.

10. An axle brake disc according to claim 9, wherein the insert element comprise 18 arms.

11. An axle brake disc according to claim 1, wherein the at least one connection comprises several screw connections.

12. An axle brake according to claim 1, wherein the at least one connection between the insert element and the hub is a screw connection and wherein the screw connections are formed at least with screw elements, which at least extend through the holes in the insert element and through the holes in the protrusions.

13. A method for producing an axle brake disc with a hub and two friction rings, which are arranged in parallel and spaced apart from one another, wherein the hub comprises several protrusions with holes, wherein said protrusions are distributed about an outer circumference of the hub and extend radially outward, wherein the method comprises at least the following steps:
   Providing a flat insert element with a basic section and several arms, wherein the insert element is formed from two partial elements which adjoin each other in a flat manner and which are soldered to each other, wherein the arms are arranged on the basic section and extend radially outwards in a stellate manner, wherein arms with a broad form and arms with a narrow form are provided and arranged alternately in their broad and narrow form on the basic section of the insert element, wherein a portion of the arms in their narrow form is separated from the basic section, wherein the basic section comprises a central opening, wherein the basic section of the insert element comprises holes;
   Joining the friction rings on the flat sides of the insert element, so that the insert element is arranged between the friction rings;
   Joining the insert element on the hub by disposing the hub in the central opening of the insert element; and
   Connecting the insert element to the hub with at least one connection.

14. A method according to claim 13, wherein the friction rings are soldered to the insert element by means of brazing.

15. A method according to claim 14, wherein the friction rings are soldered to the insert element by means of high-temperature soldering in a vacuum or in a protected gas atmosphere.

16. A method according to either of claim 14 or 15, wherein the insert element is provided from two partial elements, which are soldered to each other in conjunction with the soldering of the friction rings to the insert element.

17. A method according to claim 16, wherein for the joining of the friction rings to the insert element, means for positioning the friction rings to the insert element are provided, which comprise clamping pins which are used for positioning in holes in the friction rings and in holes in the insert element.

18. A method according to claim 17, wherein a portion of the several arms is separated from the basic section by means of machine-cutting processing of the basic section.

19. A method according to claim 16, wherein the friction rings and/or the partial elements by means of a thermal and/or an abrasive cutting method are made of plate elements.

20. A method according to claim 19, wherein the thermal and/or the abrasive cutting method comprises laser beam cutting and/or water jet cutting.

21. A method according to claim 16, wherein the friction rings and/or the partial elements, are heat treated, and wherein the heat treatment is conducted in combination with the brazing.

22. A method according to claim 21, wherein the brazing comprises high-temperature soldering in a vacuum or in a protective gas atmosphere.

23. A method according to claim 13, wherein the at least one connection between the insert element and the hub is a screw connection and wherein the screw connections are formed at least with screw elements, which at least extend through the holes in the insert element and through the holes in the protrusions.

* * * * *